United States Patent
Zheng et al.

(10) Patent No.: US 9,570,204 B2
(45) Date of Patent: Feb. 14, 2017

(54) COMPLETELY PASSIVE COOLING SYSTEM FOR REACTOR CORE AFTER ACCIDENT OF LARGE-SCALE PRESSURIZED WATER REACTOR NUCLEAR POWER PLANT

(71) Applicant: SHANGHAI NUCLEAR ENGINEERING RESEARCH & DESIGN INSTITUTE, Shanghai (CN)

(72) Inventors: Mingguang Zheng, Shanghai (CN); Cheng Ye, Shanghai (CN); Honghui Ge, Shanghai (CN); Xiankang Dong, Shanghai (CN); Guoxing Gu, Shanghai (CN); Jinquan Yan, Shanghai (CN); Fuzu Miao, Shanghai (CN); Yong Wang, Shanghai (CN); Yuanwei Ye, Shanghai (CN); Yu Chen, Shanghai (CN); Zufeng Xia, Shanghai (CN); Jian Qiu, Shanghai (CN); Yun Ling, Shanghai (CN)

(73) Assignee: Shanghai Nuclear Engineering Research & Design Institute, Shanghai (CN)

( * ) Notice: Subject to any disclaimer, the term of this patent is extended or adjusted under 35 U.S.C. 154(b) by 470 days.

(21) Appl. No.: 14/145,757

(22) Filed: Dec. 31, 2013

(65) Prior Publication Data
US 2014/0112427 A1 Apr. 24, 2014

Related U.S. Application Data

(63) Continuation of application No. PCT/CN2012/077249, filed on Jun. 20, 2012.

(30) Foreign Application Priority Data

Apr. 27, 2012 (CN) .......................... 2012 1 0127332

(51) Int. Cl.
*G21C 9/00* (2006.01)
*G21C 15/18* (2006.01)
(Continued)

(52) U.S. Cl.
CPC ............... *G21C 15/18* (2013.01); *G21C 9/004* (2013.01); *G21C 13/02* (2013.01); *Y02E 30/32* (2013.01)

(58) Field of Classification Search
CPC ....... G21C 13/00; G21C 13/022; G21C 13/10; G21C 15/18
See application file for complete search history.

(56) References Cited

U.S. PATENT DOCUMENTS

| 5,049,353 A | 9/1991 | Conway et al. | |
|---|---|---|---|
| 5,169,596 A * | 12/1992 | Orr | G21C 13/00 376/293 |

(Continued)

FOREIGN PATENT DOCUMENTS

| CN | 1108421 A | 9/1995 |
|---|---|---|
| CN | 101465167 A | 6/2009 |

(Continued)

OTHER PUBLICATIONS

Zhang, Yanxiang et al., Design of Water Distribution Device for Passive Containment Cooling System; Nuclear Power Engineering; May 2002, No. 2, pp. 103-106.

*Primary Examiner* — Marshall O'Connor
(74) *Attorney, Agent, or Firm* — Conley Rose, P.C.

(57) ABSTRACT

A passive cooling system for a reactor core of a large-scale pressurized water reactor nuclear power plant includes a shield building having an outer wall and a through air inlet arranged on an upper part of the outer wall, a water tank arranged at an upper part of the shield building, a cooling water distribution plate arranged above a top of a contain- (Continued)

ment within the shield building, a spray pipe arranged at an inside of the top of the shield building and having a water inlet end and a water outlet end, wherein the water inlet end is connected to a bottom of the water tank and the water outlet end is extended to be above the cooling water distribution plate, and an air deflector arranged between the shield building and the containment and having an upper end connected to an inside of the top of the shield building.

10 Claims, 4 Drawing Sheets

(51) Int. Cl.
    *G21C 9/004*     (2006.01)
    *G21C 13/02*     (2006.01)

(56) References Cited

U.S. PATENT DOCUMENTS

| | | | |
|---|---|---|---|
| 5,291,533 A * | 3/1994 | Orr | G21C 15/18 |
| | | | 239/193 |
| 5,345,482 A | 9/1994 | Conway et al. | |
| 2007/0092053 A1 * | 4/2007 | Sato | G21C 9/004 |
| | | | 376/283 |

FOREIGN PATENT DOCUMENTS

| | | |
|---|---|---|
| CN | 201698776 U | 1/2011 |
| CN | 102081976 A | 6/2011 |
| CN | 202102728 U | 1/2012 |
| CN | 202110832 U | 1/2012 |

\* cited by examiner

US 9,570,204 B2

COMPLETELY PASSIVE COOLING SYSTEM FOR REACTOR CORE AFTER ACCIDENT OF LARGE-SCALE PRESSURIZED WATER REACTOR NUCLEAR POWER PLANT

CROSS-REFERENCE TO RELATED APPLICATIONS

This application is a continuation of and claims priority to International Patent Application No. PCT/CN2012/077249 filed Jun. 20, 2012, entitled "Completely Passive Cooling System for Post-Incident Reactor Core of Large-Scale Pressurized Water Reactor Nuclear Power Plant", which is hereby incorporated by reference in its entirety.

BACKGROUND

On Mar. 11, 2011, Japan's Fukushima nuclear accident shocked the world. One of the major reasons resulting in the nuclear accident is that the accidents caused by the earthquake and tsunami that go beyond the design basis, Mark I units produced by GE company owned by Fukushima cannot effectively remove core residual heat, resulting in core melt which produced large amounts of hydrogen and indirectly caused overpressure of the containment. Meanwhile, because of forced injection of seawater for cooling, a huge amount of radioactive substances leaked.

After the Fukushima incident, nuclear power safety agencies and the industry at large required higher capacity for long-term passive cooling of nuclear power plants. Atomic Energy Society of Japan summarizes the lessons from the accident from 12 aspects for countermeasures and suggestions. These lessons and suggestions have very significant meanings in improving the security of worldwide nuclear power plants (including passive nuclear power plant). The fourth item of them, which is lesson from the loss of all coolant, clearly proposed to consider the method of passive natural circulation cooling, which can discharge at any occasion the residual heat of the core. These valuable lessons and suggestions have important guiding significance in enhancing the existing nuclear power technology. According to lessons and suggestions from Fukushima, a nuclear power plant having an inherent safety design, with a long-term passive residual heat removal capacity can better cover the accidents beyond design basis as in Fukushima.

AP1000 is one technology of nuclear power in the world at present, its passive core cooling system is provided with a smokestack at the central top of the conical shield building, while at the top of the shield plant, an annular tank is set up around the smokestack; the central part inside the shield building at top of the steel containment is arranged with a cooling water distribution plate hanging on flying rings; spray pipes are provided at the top of the shield building; water inlet end of the spray pipes are connected to the bottom of the water tank, and the water outlet end of the spray pipes are extended above the cooling water distribution plate; an air inlet opening therethrough is provided on the outer wall of the upper end of the shield building; air deflectors are disposed between the shield building and the steel containment; the upper end of the air deflector is connected to the top of the shield building.

Although AP1000 can meet the requirements of URD, i.e., performing the maintenance of the core safety within 72 hours without depending on the operator's operation, after 72 hours, AP1000 still need an external power supply, or helicopter, fire water tankers or other equipment to help with the discharge of residual heat, so that AP1000 is not entirely passive.

SUMMARY

The objective of the present disclosure is to provide a completely passive cooling system for a reactor core after an accident of a large-scale pressurized water reactor nuclear power plant for effecting long term passive residual heat removal for the core.

To achieve the above objective, embodiments of the present disclosure include a completely passive cooling system for a reactor core, for example after an accident of a large-scale pressurized water reactor nuclear power plant, comprising a shield building, a water tank, a cooling water distribution plate, a spray pipe, and an air deflector. A smokestack is arranged at the top of the shield building with a steel-concrete composite structure and the water tank is arranged at the upper part of the shield building and around the smokestack. The cooling water distribution plate is arranged above the top of a containment within the shield building. The spray pipe is arranged on the inside of the top of the shield building, where a water inlet end of the spray pipe is connected to the bottom of the water tank and a water outlet end of the spray pipe is extended to be above the cooling water distribution plate. A through air inlet is provided on the upper part of an outer wall of the shield building, the air deflector is arranged between the shield building and the containment, the upper end of the air deflector is connected to the inside of the top of the shield building, the top of the shield building adopts double-layer structure, a double-layer steel-concrete composite structure top is formed on the upper end of the cylindrical steel-concrete composite structure, while a cylindrical steel-concrete air flow passage is formed on the top, and the double-layer steel-concrete top forms the water tank.

In some embodiments, the double-layer steel-concrete composite structure top comprises an inner shell which is hemiellipsoid and an outer shell which is hemisphere, an opening is formed as an air flow channel at the central portions of the hemiellipsoid of the inner shell and the hemisphere of the outer shell, and a cavity as the water tank is formed by the inner shell, the outer shell and the air flow channel.

In other embodiments, the double-layer steel-concrete composite structure top comprises an inner shell which is hemiellipsoid and an outer shell which is cylinder, an opening is formed as an air flow channel at the central portions of the hemiellipsoid of the inner shell and the cylinder of the outer shell, and a cavity as the water tank is formed by the inner shell, the outer shell and the air flow channel.

In still other embodiments, the double-layer steel-concrete composite structure top comprises an inner shell which is cone and an outer shell which is cylinder, an opening is formed as an air flow channel at the central portions of the cone of the inner shell and the cylinder of the outer shell, a cavity as the water tank is formed by the inner shell, the outer shell and the air flow channel.

The steel framework at the top of the shield building may include a mesh arrangement of arched beams.

The smokestack may be arranged on the steel concrete air flow channel of the shield building, and is higher than the top of the shield building by 1-12 m.

In certain embodiments, the air deflector plate may be provided with outer border tilting outwardly by 20-60 degrees on the lower part thereof. The ratio of the spacing between the air deflector and the inner side of the containment to the spacing between the air deflector and the outer side of the shield building may be in the range of 0.15-1:1. The lower end of the air deflector may be extended to the lower part of an equipment lock gate and a personnel lock gate, while a channel is provided at a position corresponding to the equipment lock gate and the personnel lock gate, and the lower end of the air deflector is apart from the floor by 1 m-4 m.

In further embodiments of the present disclosure, the axis of the air inlet tilts upwardly by 50-80 degrees from the outside of the shield building. Two to five rows of the air inlets are provided along the circumferential direction of the shield building, the diameter of the air inlets is 7-20 cm, and the center spacing is 12-24 cm.

In accordance with various embodiments of the present disclosure: (1) the top of the shield building adopts double-layer structure, a double-layer steel-concrete composite structure top is formed on the upper end of the cylindrical steel-concrete composite structure, while a cylindrical steel-concrete composite structure middle passage is formed on the top, the double-layer steel-concrete composite structure top forms the water tank, so that the volume of the water tank is expanded, and it contains 1500 to 12000 tons of cooling water that is needed for residual heat removal which lasts for 15-40 days after 72 hours, realizing the long term passive residual heat removal for the core; (2) the steel framework at the top of the shield building adopts a mesh arrangement of arched beams, compared with the prior art, it simplifies the structure on account of the support formed between the arches so as to omit the annular support beam and cancel the inner compression annular beam. The arches in meshed arrangement can be prefabricated and integrally hoisted and installed, satisfying the requirement of structure integration production and mounting. Arch sections can also be hoisted and installed in batches at nodes according to the requirement so as to satisfy the requirement of modular production and mounting. (3) The top of the shield building adopts double-layer structure; the outer shell is used as a barrier for protection against flying objects, and it can withstand snow loads, tornado loads and aircraft crash loads. The inner shell withstands gravity loads of the water in the tank, keeping the tank's integrity in earthquake conditions. The axis of the air inlet tilts upwardly by 50-80 degrees from the outside of the shield building, improving the protection ability against aircraft crash to the shield building. (4) The top of the shield building adopts double-layer structure; the smokestack is arranged on the steel concrete flow channel of the shield building, and is higher than the top of the shield building by 1-12 m; the air deflector plate is provided with outer border tilting outwardly by 20-60 degrees on the lower part thereof; the ratio of the spacing between the air deflector and the inner side of a containment to the spacing between the air deflector and the outer side of the shield building is in the range of 0.15-1:1; the lower end of the air deflector is extended to the lower part of an equipment lock gate and a personnel lock gate, a channel is provided at a position corresponding to the equipment lock gate and the personnel lock gate, the lower end of the air deflector is apart from the floor by 1 m-4 m; the air cooling ability of the passive containment is thus improved.

BRIEF DESCRIPTION OF THE DRAWINGS

For a detailed description of exemplary embodiments of the present disclosure, reference will now be made to the accompanying drawings in which.

In the FIGS.: 1. pressure vessel; 2. a loop pressure boundary; 3. containment; 4. shield building; 5. containment cooling water tank; 6. containment cooling water pipes; 7. chimney; 8. cooling water distribution plate; 9. air deflector; 10. equipment lock gate and personnel lock gate; 11. a loop vapor release valve; 12. core; 13. air inlet; 14. inner shell; 15. outer shell; 16. air flow channel.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure relates to the field of engineered safety systems for pressurized water reactor nuclear power plant and, more particularly, to a passive cooling system for a reactor core after an accident of a large-scale pressurized water reactor nuclear power plant. In at least some embodiments, the cooling system is completely passive. The present disclosure is further understood from the description in conjunction with the accompanying figures in the following.

Figure 1:
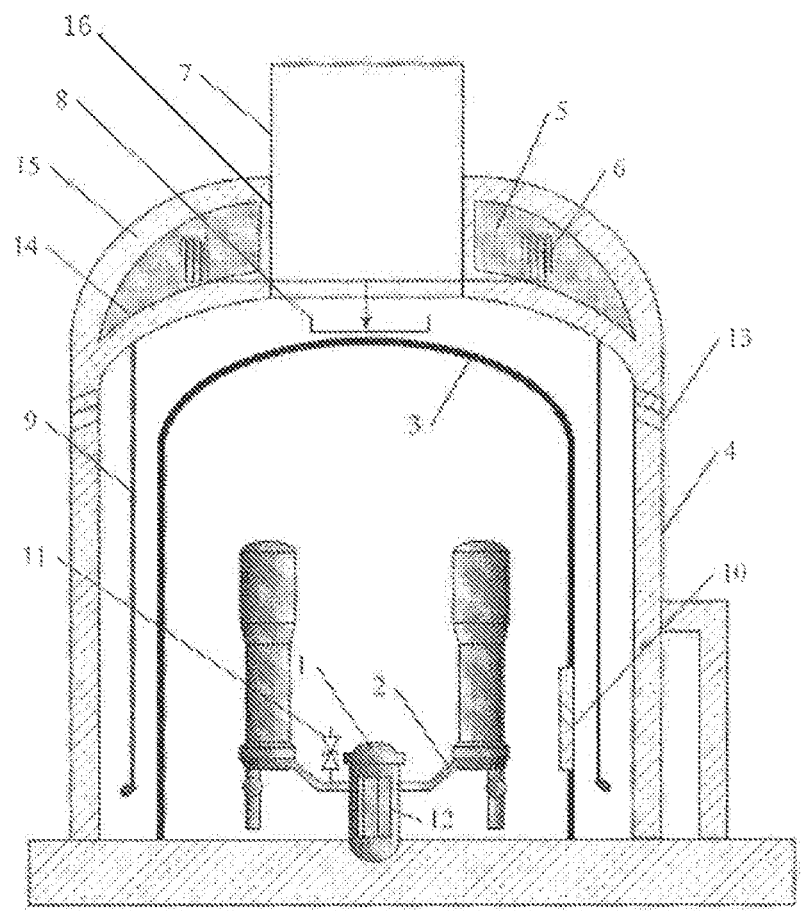
FIG. 1 is a schematic structural diagram of a completely passive cooling system for a reactor core after an accident of a large-scale pressurized water reactor nuclear power plant in accordance with embodiments of the present disclosure.
Figure 2:
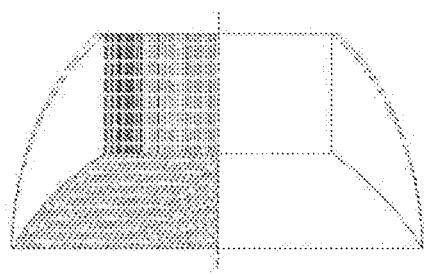
FIG. 2 is a structural stereogram of the steel framework at the top of the shield building with a steel-concrete composite structure in accordance with embodiments of the present disclosure.
Figure 3:
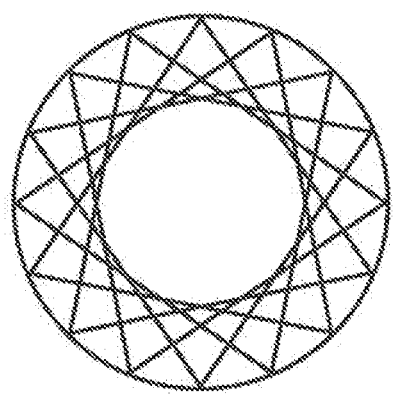
FIG. 3 is a top view of the steel framework at the top of the shield building with the steel-concrete composite structure in accordance with embodiments of the present disclosure.
Figure 4:
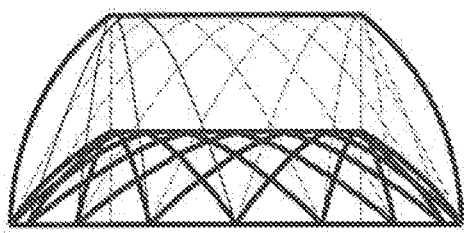
FIG. 4 is a schematic structural diagram of the hemi-ellipsoidal arch shell structure of the steel framework at the top of the shield building with the steel-concrete composite structure in accordance with embodiments of the present disclosure.

Shown in FIG. 1, the shield building 4 is a steel-concrete composite structure including a cylindrical body and a top with a double-layer structure; the top with the double-layer structure is formed on the upper end of the cylindrical body, and it includes an inner shell 14, outer shell 15 and an air flow channel 16. The steel frame at the top of the shield building 4 is shown in FIGS. 2, 3 and 4.

The inner shell 14 is a hemi-ellipsoidal arch shell, which is disposed on a tensioned stress annular beam; the outer shell 15 is a hemispheric arch shell, which is disposed in another tensioned stress annular beam. With the tensioned stress annular beam of the inner shell 14 as the outer circle and the air flow channel 16 as the inner circle, the hemi-elliptical arch beams are evenly arranged with equal angle around the center of the circle; the hemi-elliptical arch beams of the inner shell 14 are arranged in 10-16 lines, such as 10 lines, 12 lines or 16 lines; the projection of the arch beams are secant lines to the outer circle and tangent lines to the inner circle, the midpoints of the secant lines are on the circumference of the inner circle, so as to form a hemi-ellipsoidal arch shell in mesh structure; with the tensioned stress annular beam of the outer shell 15 as the outer circle and the air flow channel 16 as the inner circle, the semicircle arch beams are evenly arranged with equal angle around the center of the circle; the semicircle arch beams of the outer shell 15 may be arranged in 10-16 lines, such as 10 lines, 12 lines or 16 lines; the projection of the arch beams are secant lines to the outer circle, and tangent lines to the inner circle, the midpoints of the secant lines are on the circumference of the inner circle, so as to form a hemispheric arch shell in mesh structure; straight beams are arranged to form an opening as an air flow channel 16 at the central portion of the hemi-ellipsoidal arch shell of the inner shell 14 and the hemispheric arch shell of the outer shell 15.

A cavity as the water tank 5 is formed between the inner shell 14, the outer shell 15 and the air flow channel 16, i.e. the double-layer steel-concrete composite structure top constitutes the water tank 5. The cooling water distribution plate 8 is arranged at the top of the steel containment 3 and in the middle part inside the shield building 4; the cooling water distribution plate 8 is suspended on the arch shell of the inner shell 14. Two or three cooling water pipes 6 are disposed within the water tank 5, the water inlet ends of the cooling water pipes 6 are disposed in the water tank 5, and the water outlet ends thereof are extended through the bottom of the tank 5 to be above the cooling water distribution plate 8. The smokestack 7 which is 0 m to 12 m or higher, such as 0, 1 m, 5 m or 12 m higher, than the top of the shield building 4 is installed in the intermediate channel of the steel-concrete composite structure of the shield building 4. Inside the shield building 4, an air deflector 9 is arranged in a gap between the shield building 4 and the steel containment 3; the ratio of the spacing between the air deflector 9 and the inner side of the containment 3 to the spacing between the air deflector channel and outer side of the shield building 4 is in the range of 0.15-1:1, and it may be 0.15:1, 0.5:1 or 1:1; the lower end of the air deflector 9 is extended to the lower part of an equipment lock gate and a personnel lock gate 10, and a channel on the air deflector 9 is provided at a position corresponding to the equipment lock gate and the personnel lock gate 10; the lower end of the air deflector 9 is apart from the floor by 1 m-4 m, and it may be 1 m, 2 m or 4 m. Two to five rows of the air inlets 13 are provided along the circumferential direction at the upper part of outer side of the shield building 4, and it may be 2, 3 or 5 rows; the axis of the air inlet 13 tilts upwardly by 50-80 degrees from the outside of the shield building, and it may be 50, 65 or 80 degrees. The diameter of the air inlets is in the range of 7-20 cm, and it may be 7 cm, 10 cm or 20 cm; the center spacing is in the range of 12-24 cm, and it may be 12 cm, 20 cm or 24 cm.

Figure 5:
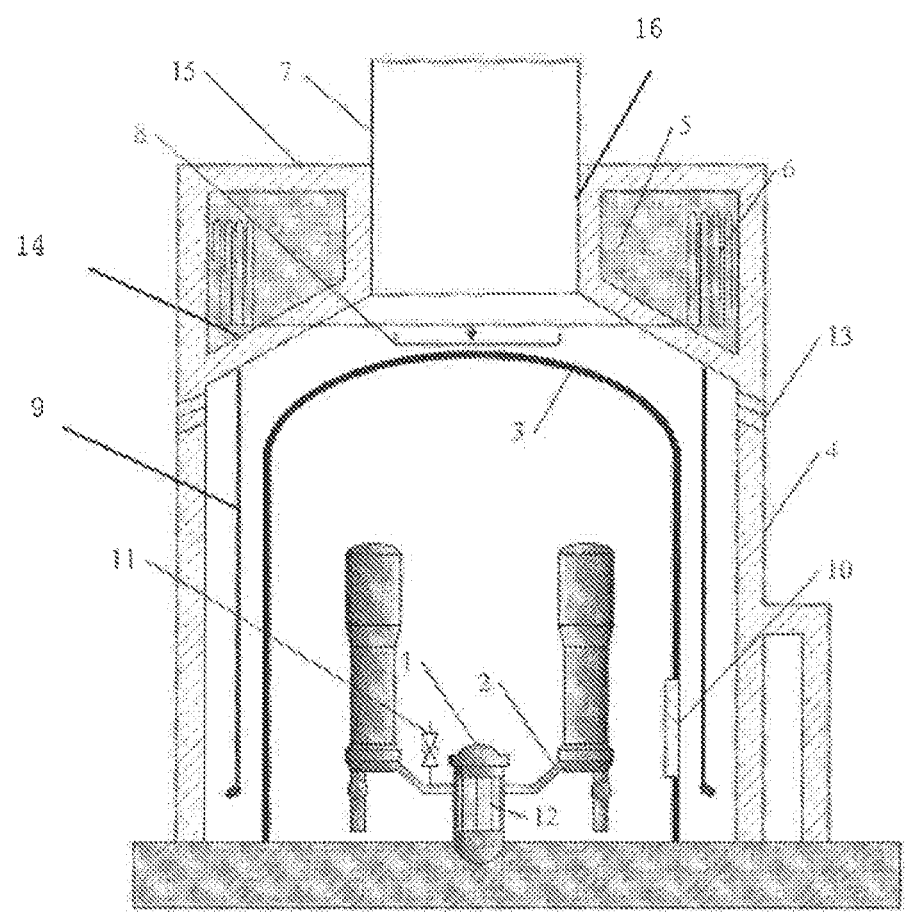
FIG. 5 is a schematic structural diagram of another completely passive cooling system for a reactor core after an accident of a large-scale pressurized water reactor nuclear power plant in accordance with embodiments of the present disclosure.

As shown in FIG. 5, the double-layer steel-concrete composite structure top of the shield building 4 includes an inner shell 14 which is conical and an outer shell 15 which is cylindrical, a cylindrical steel-concrete composite structure opening as an air flow channel 16 is formed, a cavity as the water tank 5 is formed between the inner shell 14, the outer shell 15 and the air flow channel 16, i.e. the double-layer steel-concrete composite structure top constitutes the water tank 5. The steel-concrete composite structure of the shield building 4 adopts the design of a compression ring in the prior art. The cooling water distribution plate 8 is arranged at the top of the steel containment 3 and in the middle part inside the shield building 4; the cooling water distribution plate 8 is suspended on the compression ring of the shield building 4.

Figure 6:
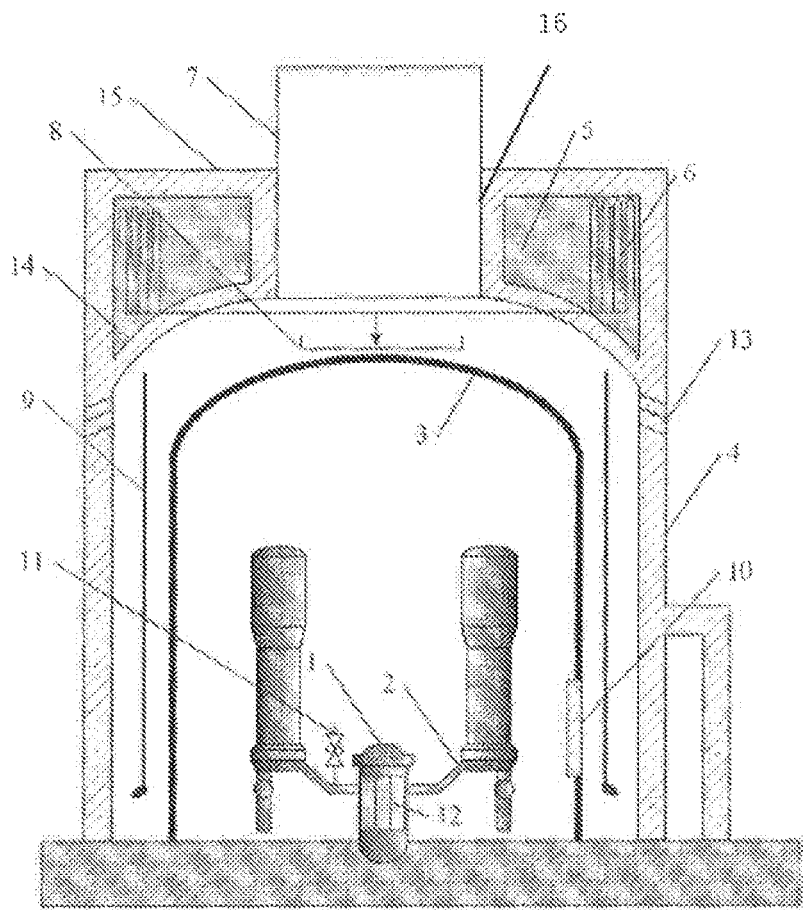
FIG. 6 is a schematic structural diagram of a third kind of completely passive cooling system for a reactor core after an accident of a large-scale pressurized water reactor nuclear power plant in accordance with embodiments of the present disclosure.

As shown in FIG. 6, the double-layer steel-concrete composite structure top of the shield building 4 includes an inner shell 14 which is hemi-ellipsoidal and an outer shell 15 which is cylindrical, a cylindrical steel-concrete composite structure opening as an air flow channel 16 is formed, a cavity as the water tank 5 is formed between the inner shell 14, the outer shell 15 and the air flow channel 16, i.e. the double-layer steel-concrete composite structure top constitutes the water tank 5. The cooling water distribution plate 8 is arranged at the top of the steel containment 3 and in the middle part inside the shield building 4; the cooling water distribution plate 8 is suspended on the arch shell of the inner shell 14.

In the event of a reactor accident, such as when a pressure vessel is broken or a loop pressure boundary 2 is broken, a loop of pressurized water turns into vapor in flash evaporation to be ejected into the containment 3; if the system is not broken, the system automatically opens a loop vapor release valve 11, the system initiatively discharges a loop of vapor into the space of the containment 3; due to the cooling outside the containment 3, condensation water reaches the bottom of the containment vessel 3 and then is heated again into evaporation to form a natural circulation, performing continuous evaporation and cooling, transferring the heat of the core 12 to the external environment. When receiving signal of the high pressure within the containment 3, the containment cooling water pipes 6 start opening automatically and injecting water to the cooling water distribution plate 8, the cooling water distribution plate 8 will evenly distribute the cooling water to flow on the containment 3, and then the evaporative cooling water takes the heat away from the containment 3. Over time, less and less cooling water is flowed onto on the containment 3, the water film coverage becomes increasingly smaller on the containment 3, at that moment, the cooling effect of the air becomes gradually remarkable; the air enters into the shield building 4 through the air inlet 13, moves downwardly along the air deflector 9, turns up along the containment 3 after reaching the bottom, and is heated by the surface of the containment 3 in the air channel between the containment 3 and the air deflector plate 9, and the flow rate is gradually increased. Eventually, the air is discharged from the chimney 7, taking the heat inside the containment 3 away, so as to achieve the purpose of cooling the reactor core 12.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A completely passive cooling system for a reactor core after an accident of a large-scale pressurized water reactor nuclear power plant, comprising:
   a shield building having an outer wall and a through air inlet arranged on an upper part of the outer wall;
   a water tank arranged at an upper part of the shield building;

a cooling water distribution plate arranged above a top of a containment within the shield building;

a spray pipe arranged at an inside of the top of the shield building and having a water inlet end and a water outlet end, wherein the water inlet end is connected to a bottom of the water tank and the water outlet end is extended to be above the cooling water distribution plate; and an air deflector arranged between the shield building and the containment and having an upper end connected to an inside of the top of the shield building, wherein a smokestack is arranged on a top of the shield building with a steel-concrete composite structure, wherein the water tank is arranged around the smokestack, and wherein the shield building comprises a double-layer steel-concrete composite structure top which is a double layer structure and is formed on an upper end of a cylindrical steel-concrete composite structure, while a cylindrical steel-concrete air flow passage is formed on the double-layer steel-concrete composite structure top, and the double-layer steel-concrete composite structure top forms the water tank;

wherein a ratio of a spacing between the air deflector and an inside of the containment to a spacing between the air deflector channel and an outside of the shield building is in the range of 0.15-1:1.

2. The completely passive cooling system for a reactor core after an accident of a large-scale pressurized water reactor nuclear power plant according to claim 1, wherein the double-layer steel-concrete composite structure top comprises an inner shell which is hemiellipsoid and an outer shell which is hemisphere, an opening is formed as an air flow channel at central portions of the hemiellipsoid of the inner shell and the hemisphere of the outer shell, and a cavity as the water tank is formed by the inner shell, the outer shell and the air flow channel.

3. The completely passive cooling system for a reactor core after an accident of a large-scale pressurized water reactor nuclear power plant according to claim 1, wherein the double-layer steel-concrete composite structure top comprises an inner shell which is hemiellipsoid and an outer shell which is cylinder, an opening is formed as an air flow channel at central portions of the hemiellipsoid of the inner shell and the cylinder of the outer shell, and a cavity as the water tank is formed by the inner shell, the outer shell and the air flow channel.

4. The completely passive cooling system for a reactor core after an accident of a large-scale pressurized water reactor nuclear power plant according to claim 1, wherein the double-layer steel-concrete composite structure top comprises an inner shell which is cone and an outer shell which is cylinder, an opening is formed as an air flow channel at central portions of the cone of the inner shell and the cylinder of the outer shell, and a cavity as the water tank is formed by the inner shell, the outer shell and the air flow channel.

5. The completely passive cooling system for a post-incident reactor core of a large-scale pressurized water reactor nuclear power plant according to claim 1, wherein a steel framework of the steel-concrete composite structure at the top of the shield building adopts a mesh arrangement of arched beams.

6. The completely passive cooling system for a reactor core after an accident of a large-scale pressurized water reactor nuclear power plant according to claim 1, wherein the smokestack is arranged on the steel-concrete air flow channel of the shield building, and is higher than the top of the shield building by 0-12 m.

7. The completely passive cooling system for a reactor core after an accident of a large-scale pressurized water reactor nuclear power plant according to claim 1, wherein the air deflector plate is provided with an outer border tilting outwardly by 20-60 degrees on a lower part thereof.

8. The completely passive cooling system for a reactor core after an accident of a large-scale pressurized water reactor nuclear power plant according to claim 1, wherein a lower end of the air deflector is extended to a lower part of an equipment lock gate and a personnel lock gate, a channel is provided at a position corresponding to the equipment lock gate and the personnel lock gate, and the lower end is apart from a floor by 1 m-4 m.

9. The completely passive cooling system for a reactor core after an accident of a large-scale pressurized water reactor nuclear power plant according to claim 1, wherein an axis of the air inlet tilts upwardly by 50-80 degrees from an outside of the shield building.

10. The completely passive cooling system for a reactor core after an accident of a large-scale pressurized water reactor nuclear power plant according to claim 1, further comprising a plurality of through air inlets wherein two to five rows of the air inlets are provided along a circumferential direction of the shield building, a diameter of the air inlets is in range of 7-20 cm, and a center spacing is in range of 12-24 cm.

* * * * *